(12) United States Patent
Reddin et al.

(10) Patent No.: US 9,158,568 B2
(45) Date of Patent: Oct. 13, 2015

(54) INPUT/OUTPUT OPERATIONS AT A VIRTUAL BLOCK DEVICE OF A STORAGE SERVER

(75) Inventors: Timothy Reddin, Spiddal (IE); Liam Noel Kelleher, Oranmore (IE); Alistair Coles, Bath Somerset (GB); Aled Edwards, Charfield (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 781 days.

(21) Appl. No.: 13/360,956

(22) Filed: Jan. 30, 2012

(65) Prior Publication Data

US 2013/0198738 A1 Aug. 1, 2013

(51) Int. Cl.
*G06F 12/00* (2006.01)
*G06F 9/455* (2006.01)

(52) U.S. Cl.
CPC .. *G06F 9/45558* (2013.01); *G06F 2009/45579* (2013.01)

(58) Field of Classification Search
CPC .................................. G06F 12/00; G06F 3/06
USPC .................. 711/100, 111, 112, 113, 114, 154
See application file for complete search history.

(56) References Cited

U.S. PATENT DOCUMENTS

| | | | |
|---|---|---|---|
| 6,745,207 B2 | 6/2004 | Reuter et al. | |
| 6,934,799 B2 | 8/2005 | Acharya et al. | |
| 7,689,803 B2 | 3/2010 | Karr et al. | |
| 7,734,882 B2 | 6/2010 | Malkin | |
| 8,046,446 B1 | 10/2011 | Karr et al. | |
| 8,315,991 B2 * | 11/2012 | Mandagere et al. | 707/690 |
| 2005/0228950 A1 | 10/2005 | Karr | |
| 2005/0235132 A1 | 10/2005 | Karr et al. | |
| 2006/0248285 A1 | 11/2006 | Petev | |
| 2009/0158432 A1 | 6/2009 | Zheng et al. | |
| 2009/0307716 A1 | 12/2009 | Nevarez et al. | |
| 2010/0125730 A1 | 5/2010 | Dodgson et al. | |
| 2010/0169497 A1 | 7/2010 | Klimentiev et al. | |
| 2010/0186014 A1 * | 7/2010 | Vaghani et al. | 718/101 |
| 2010/0268764 A1 | 10/2010 | Wee et al. | |
| 2010/0274772 A1 | 10/2010 | Samuels | |
| 2011/0022812 A1 | 1/2011 | Van der Linden et al. | |
| 2011/0119668 A1 | 5/2011 | Calder et al. | |
| 2011/0154320 A1 | 6/2011 | Verma | |
| 2011/0161291 A1 | 6/2011 | Taleck et al. | |
| 2011/0161496 A1 | 6/2011 | Nicklin | |
| 2011/0184963 A1 * | 7/2011 | Singh Thakur et al. | 707/755 |
| 2011/0197039 A1 | 8/2011 | Green et al. | |
| 2011/0264906 A1 | 10/2011 | Pourzandi et al. | |
| 2011/0271062 A1 | 11/2011 | Chen | |

(Continued)

OTHER PUBLICATIONS

Ajay Gulati et al., "BASIL: Automated IO Load Balancing Across Storage Devices," USENIX Conference on File and Storage Technologies (FAST), Feb. 2010, available at: <http://labs.vmware.com/publications/basil>.

(Continued)

*Primary Examiner* — Tuan Thai
(74) *Attorney, Agent, or Firm* — Hewlett-Packard Patent Department

(57) ABSTRACT

Example embodiments disclosed herein relate to input/output (I/O) operations at a virtual block device of a storage server. Example embodiments include requesting an input/output (I/O) operation at an offset of a virtual block device of a storage server in response to a virtual machine request for an I/O operation at a virtual disk.

15 Claims, 5 Drawing Sheets

(56) References Cited

U.S. PATENT DOCUMENTS

2011/0289310 A1 11/2011 Selgas et al.
2013/0151802 A1* 6/2013 Bahadure et al. ............. 711/162

OTHER PUBLICATIONS

Huawei Technologies Co., Ltd.,"Brain of the Virtualized Data Center—Network Virtual Machine-aware Solution," retrieved from: <http://www.huawei.com/enterprise/catalog.do?id=16407>, retrieved on Feb. 2, 2012; available at: <http://enterprise.huawei.com/en/enterprise/catalog.do?id=16407>.

J. Satran et al., "Internet Small Computer Systems Interface (iSCSI)," Network Working Group, Request for Comments: 3720, Apr. 2004, available at: <http://tools.ietf.org/pdf/rfc3720.pdf>.

Dai Jiazhu et al., "A PKI-based Mechanism for Secure and Efficient Access to Outsourced Data," 2nd International Conference on Networking and Digital Society (ICNDS), May 30-31, 2010, pp. 640-643.

Kalman Meth et al., "Features of the iSCSI Protocol," IEEE Communications Magazine, Aug. 2003, pp. 72-75, available at: <http://dslab.ee.ncku.edu.tw/~labyrinth/research/paper/Features%20of%20the%20iSCSI%20protocol.pdf>.

Shai Harmelin et al., "Isilon IQ and VMware vSphere 4.1: Best Practices for VMware vSphere Using Isilon IQ Scale-out Storage," Isilon Systems, Feb. 2011, Available at: <http://www.isilon.com/file-handler-show//1517/library-best-practices-guide-vmware-vsphere-0.pdf>.

T Wu, "The SRP Authentication and Key Exchange System," Network Working Group, Request for Comments: 2945, Sep. 2000, available at: <http://www.ietf.org/rfc/rfc2945.txt>.

VMWare, Inc., "Virtualized iSCSI SANs: Flexible, Scalable Enterprise Storage for Virtual Infrastructures," VMware White Paper, Mar. 2008, Available at: <http://www.vmware.com/files/pdf/partners/dell-eql-iscsi-sans-wp.pdf>.

W. Simpson, "PPP Challenge Handshake Authentication Protocol (CHAP)," Network Working Group, Request for Comments: 1994, Aug. 1996, available at: <http://tools.ietf.org/pdf/rfc1994.pdf>.

Non-Final Office Action, U.S. Appl. No. 13/407,050, Date Issued: Jan. 6, 2015, pp. 1-13.

* cited by examiner

INPUT/OUTPUT OPERATIONS AT A VIRTUAL BLOCK DEVICE OF A STORAGE SERVER

BACKGROUND

In computing systems, storage for a computing device may be provided locally or remotely. For example, a client server may access remote storage managed by a separate storage server. In such examples, the storage server may manage a plurality of storage devices, and the client server may utilize the storage devices by communicating with the storage server.

BRIEF DESCRIPTION OF THE DRAWINGS

The following detailed description references the drawings, wherein.

DETAILED DESCRIPTION

Figure 1:
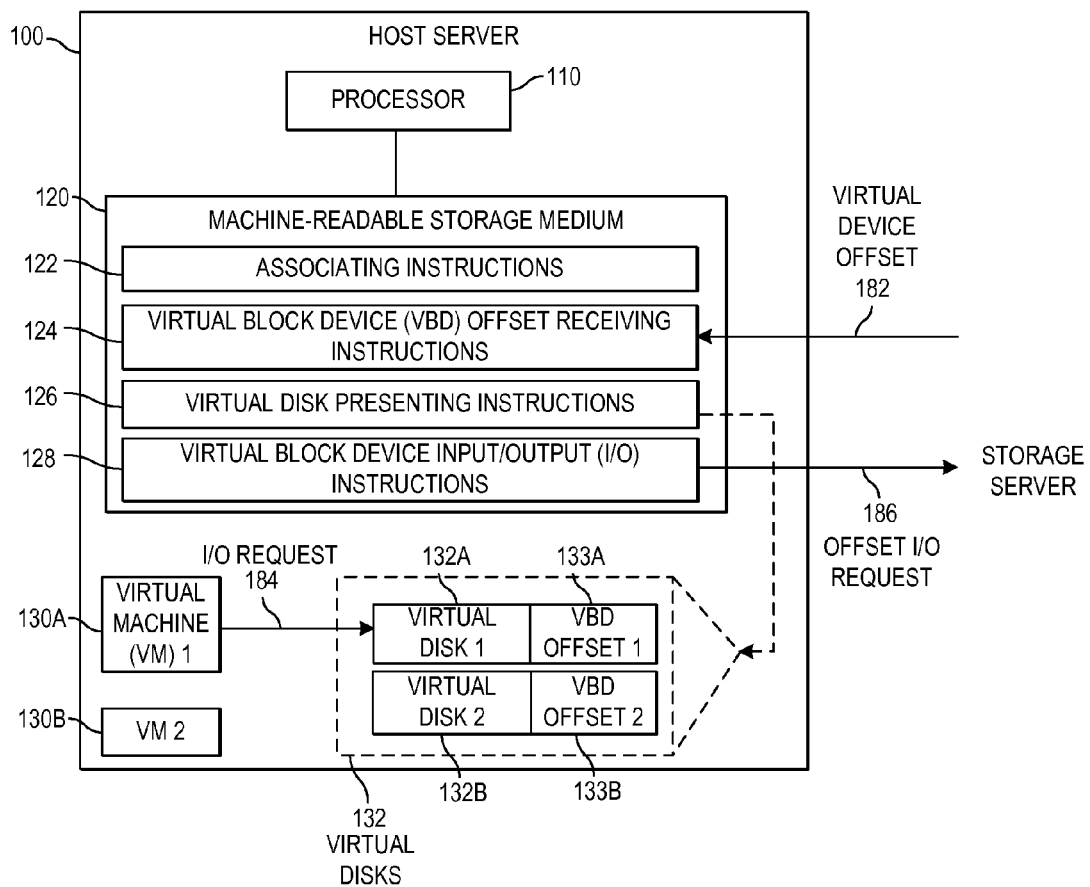
FIG. 1 is a block diagram of an example host server to access a virtual block device at a target offset.

As noted above, a computing device may access remote storage managed by a separate storage server. For example, an enterprise offering cloud computing services to consumers may implement a cloud computing system including a plurality of host servers and a plurality of storage servers. In such examples, a consumer's virtual machine may be hosted on one of the enterprise's host servers, and the host server may access persistent storage for the virtual machine on at least one of the enterprise's storage servers servicing a plurality of the enterprise's host servers. In some examples, a consumer's virtual machine may be scheduled to run on any one of the host servers. In such examples, each host server should be capable of gaining access to storage of any of the storage servers so that the host may provide the consumer's virtual machine with access to its persistent storage.

In some examples, a host server may host at least one virtual machine, and each storage server may manage at least one physical storage device. In some examples, a storage server may logically subdivide its physical storage into logical units or volumes. The storage server may further present any of these logical units to a host server as an attachable unit of storage on demand. Each of these attachable units may be individually attached by a host server for input/output (I/O) access (e.g., I/O operations) by virtual machines hosted at the host server. In such examples, each attachable unit may be associated with identification information that may be used by a host server to perform I/O operations at the attachable unit. For example, the identification information may be a logical unit number (LUN), a LUN in combination with other hierarchical information (e.g., information identifying a target entity associated with the LUN on the storage server), or the like. In such examples, each attachable unit may be referred to as a LUN.

In one example, a relatively large cloud computing system deployment may include thousands of host servers (e.g., about 5,000), each of which may host around 100 virtual machines. Additionally, each of the virtual machines may access multiple logical units of storage. As such, in some scenarios in the above deployment, a single storage server may be expected to present enough attachable units for each of the logical units of the virtual machines, or up to around 100,000 individual attachable units, for example.

However, some cloud computing system implementations may encounter difficulties in such large scale deployments. For example, some cloud computing system implementations may limit the number of attachable units per storage server to about a few thousand, for example, and/or experience a decrease in performance as the number of attachable units per storage server approaches this level. Such implementation limits are significantly inadequate for the large scale deployment described above, for example.

To address these issues, examples disclosed herein may allow a host server to access a plurality of logical units of a storage server at respective offsets of a single virtual block device of the storage server. In such examples, each of the logical units may be mapped to a respective offset of the virtual block device. In this manner, examples described herein may allow a storage server to provide access to a plurality of logical units through one attachable unit, namely the virtual block device. In such examples, a storage server may provide one virtual block device for each host server accessing at least one logical unit of the storage server. The virtual block devices may be presented as attachable units, for example, while logical units of the storage server are mapped to the virtual block devices. As such, examples described herein may reduce the number of attachable units at a storage server by using one attachable unit per host server accessing at least one logical unit of the storage server. Accordingly, in the example described above, a storage server may be expected to provide up to a few thousand attachable units (i.e., one per host), as opposed to around 100,000 in some examples.

Additionally, in some examples, the host server may present virtual disks to the virtual machines hosted at the host server, where each virtual disk is associated with an offset of a virtual block device. In such examples, the host server may route a virtual machine's request for an I/O operation at one of the virtual disks to an offset of the virtual block device. For example, the host server may, in response to a virtual machine's request for an I/O operation at one of the virtual disks, request an I/O operation at a virtual block device offset associated with the virtual disk. In response to this request, the storage server may access the logical unit mapped to the virtual block device at the requested offset. By presenting the virtual machines with virtual disks mapped to the virtual block device, examples described herein may utilize a single virtual block device (and attachable unit) per host to access multiple logical units of a storage server in a manner that is transparent to the virtual machines. Additionally, by controlling which virtual disks each virtual machine may access, examples disclosed herein may control which portions of the virtual block device each virtual machine may access.

Referring now to the drawings, FIG. 1 is a block diagram of an example host server 100 to access a virtual block device at a target offset. Any host server described herein may be, for example, a computing device such as a web server, a database server, a Local Area Network (LAN) server, or any other server or computing device suitable for hosting at least one virtual machine and communicating with other servers via at least one network. As used herein, a network may be, for example, a computer network, telephone network, or a combination thereof. In some examples, suitable computer networks include, for example, a LAN, a wireless local area network (WLAN), a wide area network (WAN), an enterprise private network, a virtual private network (VPN), the Internet, and the like.

In the example of FIG. 1, host server 100 includes a processor 110 and a machine-readable storage medium 120 including instructions 122, 124, 126, and 128. In some examples, storage medium 120 may include additional instructions. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionality of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

In the example of FIG. 1, host server 100 may host at least one virtual machine. For example, host server 100 may host virtual machines 130A and 130B. In other examples, host server 100 may host more than two virtual machines. Any virtual machine described herein may be, for example, a resource generated by the execution of machine-readable instructions on a physical computing device platform and capable of performing functions of a physical computing device, such as the execution of machine-readable instructions, performing I/O operations, etc. Any virtual machine described herein may be able to, for example, execute an operating system, execute multiple applications, and/or execute multiple applications within an operating system executed by the virtual machine. In some examples, host server 100 may include a hypervisor to manage the execution of a plurality of virtual machines on host server 100, including virtual machines 130A and 130B.

Machine-readable storage medium 120 includes instructions 122 for associating a virtual block device of a storage server with host server 100. In the example of FIG. 1, the storage server may create a virtual block device. As used herein, a "virtual block device" may be an access control module defining an address space into which physical and logical units of storage may be mapped at respective offsets, and that may route a received request for an I/O operation to a unit of storage mapped to an offset specified in the I/O operation request. Any virtual block device described herein may be implemented, for example, in the form of executable instructions encoded on a machine-readable storage medium, in the form of electronic circuitry, or a combination thereof. In some examples, a virtual block device may receive and route block level I/O operations. Additionally, as used herein, a "virtual block device offset" may be an offset in the address space of a virtual block device. For example, offsets in the address space of a first virtual block device may be referred to herein as first virtual block device offsets.

In some examples, the storage server may present the virtual block device to host server 100 as an attachable unit. For example, the storage server may assign identification information to the virtual block device. In such examples, associating instructions 122 may associate the virtual block device with host server 100 by attaching the virtual block device as a storage device at host server 100. For example, instructions 122 may receive and store the identification information such that host server 100 may subsequently utilize the identification information to request I/O operations at the virtual block device. In some examples, the identification information may include a LUN assigned to the virtual block device by the storage server. In such examples, instructions 122 may attach the virtual block device using at least the LUN assigned to the virtual block device.

In some examples, the storage server may also manage at least one physical storage device. The storage server may, for example, logically subdivide some or all physical storage devices it manages into a plurality of logical units or volumes. Information may be stored in the physical storage device and/or the logical units by entities in communication with the storage server, such as host server 100. In some examples, the storage server may maintain the stored information regardless of whether the entity that stored the data is currently connected to the storage server. As such, logical volumes managed by the storage server may be referred to herein as "persistent volumes". In some examples, a persistent volume may also be a physical device that is not subdivided into logical volumes. In some examples, the storage server may implement block storage at each of the persistent volumes, such that I/O operations may be performed at the block level for each of the persistent volumes.

In some examples, the virtual block device may maintain an address space into which persistent volumes may be mapped at various offsets in the address space. For example, each persistent volume mapped into the virtual block device may be mapped to at least one range of offsets of the virtual block device. In some examples, the range of offsets to which a persistent volume is mapped may be maintained in the virtual block device by storing a boundary offset representing one boundary of the range (e.g., a lower boundary) and the size of the persistent volume. In other examples, the mapping of any persistent volume to a virtual block device may be fragmented. For example, two or more portions of the persistent volume may be mapped to two or more non-contiguous ranges of offsets in the virtual block device. In some examples, the virtual block device may receive a request for an I/O operation at a target offset of the virtual block device. As used herein, a "target offset" is an offset of a virtual block device specified, in a request for an I/O operation, as the location at which to perform the requested I/O operation at the virtual block device. In response to such a request, the virtual block device may route the I/O operation request to the persistent volume mapped to the virtual block device at the target offset. For example, in response to such an I/O operation request, the virtual block device may request or perform an I/O operation at the appropriate offset of the persistent volume mapped to the target offset of the virtual block device. In some examples, the I/O operation requests received and processed by the virtual machine may be block level I/O operation requests. In such examples, the virtual block device may process block level I/O operation requests by requesting block level I/O operations at the persistent volume.

In the example of FIG. 1, instructions 124 may receive virtual block device offsets to which respective persistent volumes managed by the storage server are mapped. In some examples, the offsets received by instructions 124 may be respective boundary offsets for each of a plurality of persistent volumes mapped to the virtual block device. In some examples, instructions 124 may also receive the respective sizes of the persistent volumes. In the example of FIG. 1, instructions 124 may receive the offsets via at least one offset communication 182. In some examples, the offset communications 182 may be received from a system manager of a cloud computing system including host server 100 and the storage server.

After instructions 124 receive the virtual block device offsets, virtual disk presenting instructions 126 may present a plurality of virtual disks 132 to virtual machines 130A and 130B of host server 100. In some examples, any virtual machine hosted at host server 100 may be assigned or given access to any of virtual disks 132. In the example of FIG. 1, each of the presented virtual disks may be associated with one of the virtual block device offsets received by instructions 124. As such, each of virtual disks 132 is mapped to the virtual block device attached at host server 100. In some examples, the virtual disks 132 may be virtual representations at host server 100 of the persistent volumes mapped to the virtual block device. In other examples, at least some of virtual disks 132 may be mapped to virtual block devices of different storage servers.

In the example of FIG. 1, instructions 126 may present a virtual disk 132A associated with a virtual block device offset 133A, and a virtual disk 132B associated with a different virtual block device offset 133B. In some examples, virtual disks 132 may be virtual representations of block storage devices presented to virtual machines 130A and 130B by instructions 126 such that the virtual machines may recognize and interact with virtual disks 132 as if they were local physical block storage devices.

In the example of FIG. 1, instructions 128 may provide to the storage server a request 186 for an I/O operation at a target offset of the virtual block device of the storage server. In such examples, request 186 may be a request for any type of I/O operation, such as a read operation, a write operation, or the like. Additionally, request 186 may be a request for a block level I/O operation, for example. In some examples, each request 186 may be an I/O operation request. Additionally, any I/O operation request described herein that is provided to a storage server (e.g., request 186) may be provided using, for example, the Internet Small Computer System Interface (iSCSI) protocol, the advanced technology attachment (ATA) over Ethernet (AOE) protocol, or any other protocol suitable for providing storage device I/O operation requests over a network.

In the example of FIG. 1, instructions 128 may provide a request 186 in response to any valid virtual machine request 184 for an I/O operation at any one of virtual disks 132. As used herein, a virtual machine request refers to a request made by virtual machine. In some examples, a virtual machine request may be provided to a virtual disk directly, or through intervening layers that may modify or reroute the request. In such examples, an I/O operation at a virtual block device may be requested in response to a virtual machine request, regardless of whether the virtual machine request is provided directly to a virtual disk, or is processed, rerouted, modified, or the like, by at least one intervening component before a virtual disk is accessed in response to the request.

In some examples, the target offset may be based on the virtual block device offset associated with the virtual disk accessed in response to the virtual machine request. In some examples, the virtual machine request may be provided directly to a virtual disk. In such examples, the virtual disk accessed (e.g., via an I/O operation) in response to the virtual machine request may be the virtual disk specified in the virtual machine request. In other examples, at least one component or layer may process, reroute and/or modify the initial virtual machine request. In such examples, the target offset may be based on the offset associated with the virtual disk that is ultimately accessed in response to the initial virtual machine request. For example, the virtual disk accessed may be different than the virtual disk specified in the initial virtual machine request.

In the example of FIG. 1, virtual machine 130A may provide a request 184 for an I/O operation at virtual disk 132A, presented by instructions 126. In some examples, instructions 126 may determine whether the request 184 is a valid request. For example, instructions 126 may determine whether the request 184 meets certain validity conditions. As an example, instructions 126 may determine that request 184 is valid if the request is made by a virtual machine with permission to access the virtual disk of the request, such as a virtual machine assigned to the virtual disk of the request. Other example validity conditions may include whether the request 184 is a request for a valid I/O operation (e.g., read, write, etc.), whether the request is properly formatted, and the like.

In such examples, after instructions 126 determine that the request 184 is a valid request, instructions 128 may provide to the storage server a request 186 for an I/O operation at a target offset of the virtual block device. The request 186 may request the same type of I/O operation (e.g., read, write, etc.) as the request 184, for example. In some examples, the target offset may be based on virtual block device offset 133A associated with virtual disk 132A, which is the virtual disk accessed in response to virtual machine request 184. For example, the request 184 may specify an offset of virtual disk 132A for the requested I/O operation. In such examples, instructions 128 may determine the target offset based on the specified offset of request 184 and the virtual block device offset 133A. For example, these offsets may be combined (e.g., added, etc.) to yield a target offset that is within the range of virtual block device offsets to which a persistent volume corresponding to virtual disk 132A is mapped.

While two virtual disks 132 are shown in the example of FIG. 1, instructions 126 may present to the virtual machines more than two virtual disks 132, each associated with a respective virtual block device offset. In such examples, instructions 128 may provide a request 186 for an I/O operation at a target offset of the virtual block device in response to any valid virtual machine request 184 for an I/O operation at one of the virtual disks 132.

Examples described herein may allow host server 100 to access a plurality of persistent volumes of the storage server at respective offsets of a single virtual block device of the storage server. In this manner, the storage server may provide access to a plurality of persistent volumes by presenting one attachable unit, namely the virtual block device, rather than an attachable unit for each persistent volume. Accordingly, examples described herein may significantly reduce the number of attachable units presented by a storage server in large scale cloud computing deployments. Additionally, in some examples, the virtual machines may interact with the virtual disks as they would with physical storage devices, while host server 100 routes I/O operations to the persistent volumes of the storage server through the virtual block device. For example, by making a request 186 to access an offset of the virtual block device in response to each valid virtual machine request 184 to access a virtual block device, the virtual machines of host server 100 may access a plurality of persistent volumes through one attachable unit in a manner that is transparent to the virtual machines.

Figure 2:
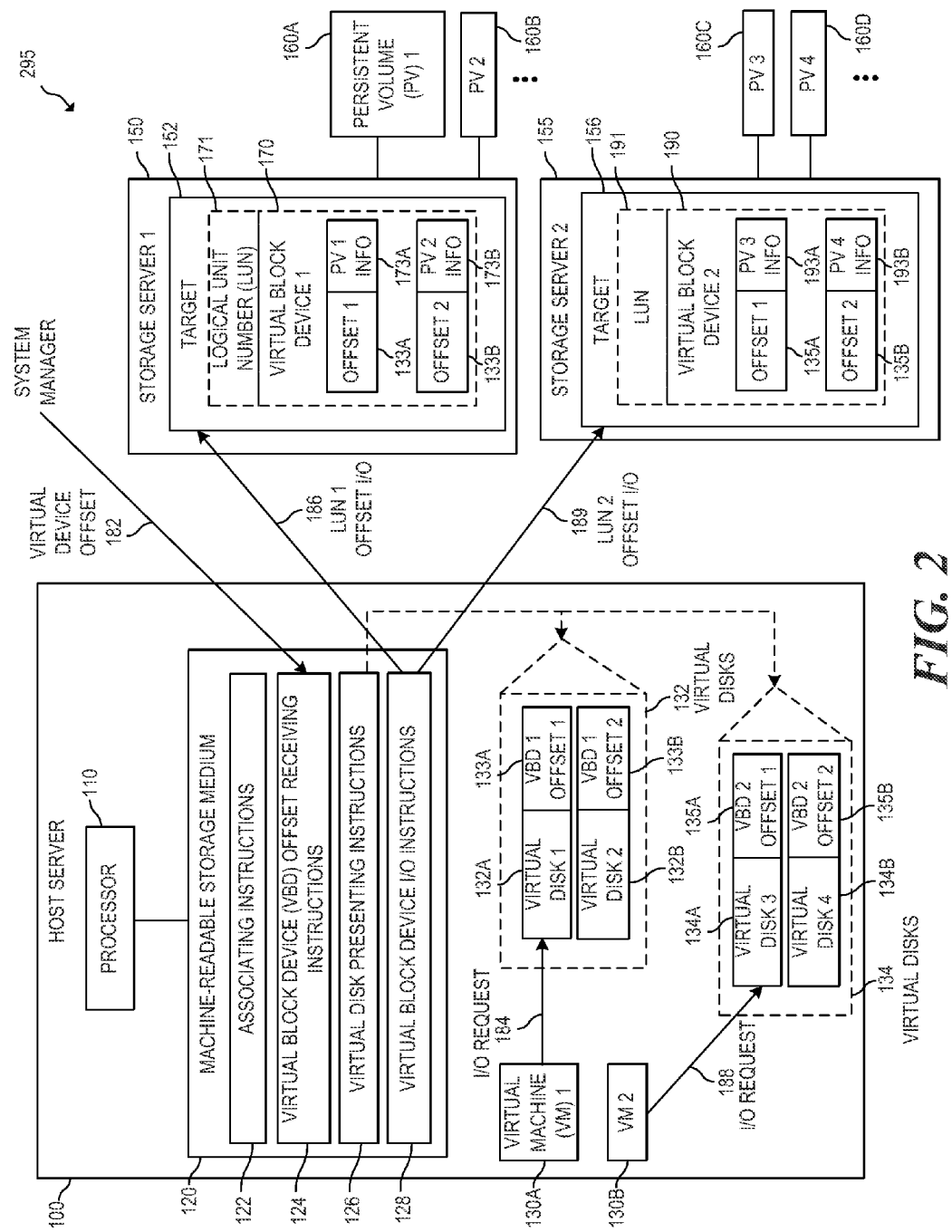
FIG. 2 is a block diagram of an example system including a host server to access respective virtual block devices of a plurality of storage servers.

FIG. 2 is a block diagram of an example system 295 including a host server 100 to access respective virtual block devices 171 and 191 of a plurality of storage servers 150 and 155. In the example of FIG. 2, system 295 may include a host server 100, as described above in relation to FIG. 1. In some examples, system 295 may also include a storage server 150, which may be referred to as a first storage server, and a storage server 155, which may be referred to as a second storage server. In other examples, system 295 may include more than two storage servers. In some examples, system 295 may include more than two host servers and/or more than two host servers.

Any storage server described herein may be, for example, a computing device such as a web server, a database server, a Local Area Network (LAN) server, or any other server or computing device suitable for providing a host server access to storage via at least one network. Each of storage servers 150 and 155 may manage persistent volumes, as described above in relation to FIG. 1. In the example of FIG. 2, storage server 150 may manage persistent volumes 160A and 160B and storage server 155 may manage persistent volumes 160C and 160D. In other examples, storage servers 150 and 155 may each manage more persistent volumes.

In some examples, each of the persistent volumes managed by a storage server may be at least a portion of a physical storage device or logical volume located at the storage server or presented to the storage by a separate storage controller. For example, a persistent volume may be a physical storage device, a logical unit of at least one physical storage devices, a logical unit of at least one virtual volume presented to the storage server, or any other portion of physical or virtual storage. Physical storage devices described herein may be, for example, any type of memory or other electronic circuitry for storing data in any suitable format. In some examples, a physical storage device may be at least one of a hard disk drive, a solid state drive, a tape drive, and the like, or a combination thereof.

In some examples, storage server 150 may create a virtual block device 170, as described above in relation to FIG. 1. Virtual block device 170 may be referred to as a first virtual block device. Persistent volumes managed by storage server 150 may be mapped to offsets of virtual block device 170. In the example of FIG. 2, persistent volumes 160A and 160B are mapped to offsets 133A and 133B, respectively. In some examples, the offsets to which the persistent volumes are mapped may be boundary offsets, as described above. In the example of FIG. 2, each offset to which a persistent volume is mapped is associated with information for the persistent volume mapped to that offset. For example, offset 133A is associated with information 173A for persistent volume 160A, and offset 133B is associated with information 173B for persistent volume 160B. In some examples described herein, the persistent volume information may include the size of the corresponding persistent volume and/or any information needed to route an I/O operation request to the persistent volume. Additional persistent volumes managed by storage server 150 may or may not be mapped to virtual block device 170.

In the example of FIG. 2, storage server 150 may also create a communication protocol target 152, through which host server 100 may interact with storage server 150 using the communication protocol. In some examples, the communication protocol may be an iSCSI protocol, and target 152 may be an iSCSI target. Storage server 150 may also associate virtual block device 170 with a LUN 171 of target 152 to link virtual block device 170 with target 152. In such examples, storage server 150 may present virtual block device 170 to host server 100 as an attachable unit by associating virtual block device 170 with LUN 171 of target 152.

Additionally, in the example of FIG. 2, storage server 155 may create a virtual block device 190, as described above in relation to FIG. 1, and persistent volumes managed by storage server 155 may be mapped to offsets of virtual block device 190. Virtual block device 190 may be referred to as a second virtual block device. For example, persistent volumes 160C and 160D may be mapped to offsets 135A and 135B, respectively. In addition, offset 135A is associated with information 193A for persistent volume 160C, and offset 135B is associated with information 193B for persistent volume 160D. Additional persistent volumes managed by storage server 155 may or may not be mapped to virtual block device 190. In some examples, storage server 155 may also create a communication protocol target 156, such as an iSCSI target, through which host server 100 may interact with storage server 155. Storage server 155 may also associate virtual block device 190 with a LUN 191 of target 156 to link virtual block device 190 with target 156. In such examples, storage server 155 may present virtual block device 190 to host server 100 as an attachable unit by associating virtual block device 190 with LUN 191 of target 152.

As described above in relation to FIG. 1, host server 100 includes machine-readable storage medium 120, including instructions 122, 124, 126, and 128. In the example of FIG. 2, instructions 122 may associate virtual block device 170 of storage server 150 with host server 100 and may associate virtual block device 190 of storage server 155 with host server 100. For example, instructions 122 may attach virtual block devices 170 and 190 at host server 100. In some examples, instructions 122 may attach virtual block device 170 using LUN 171 and information identifying target 152. Instructions 122 may also attach virtual block device 190 using LUN 191 and information identifying target 156.

In some examples, instructions 124 may receive offsets of virtual block device 170 at which persistent volumes managed by storage server 150 are mapped. For example, instructions 124 may receive offsets 133A and 133B to which persistent volumes 160A and 160B are mapped, respectively. Instructions 124 may also receive offsets of virtual block device 190 at which persistent volumes managed by storage server 155 are mapped. For example, instructions 124 may receive offsets 135A and 135B to which persistent volumes 160C and 160D are mapped, respectively. As described above in relation to FIG. 1, the offsets may be received by instructions 124 from a system manager via at least one offset communication 182. In some examples, offset communications 182 may be provided to host server 100 using out-of-band communication. For example, instructions 124 may receive the offsets via a protocol different than the protocol used by host server 100 for I/O operation communications with storage servers (e.g., iSCSI, AOE, etc.).

In some examples, host server 100 may host at least one virtual machine, as described above in relation to FIG. 1. In the example of FIG. 2, instructions 126 may present a plurality of virtual disks to the virtual machines hosted at host server 100, such as virtual machines 130A and 130B. In some examples, any virtual machine hosted at host server 100 may be assigned or given access to any virtual disk of host server 100. In some examples, each of the virtual disks presented by instructions 126 may be associated with a respective offset of the same virtual block device. In other examples, each of the virtual disks may be associated with an offset of any one of a plurality of virtual block devices of different storage servers. For example, instructions 126 may present virtual disks 132 and 134 to the virtual machines, as described above in relation to FIG. 1. In such examples, each of virtual disks 132 may be associated with one of the received offsets for virtual block device 170, while each of virtual disks 134 may be associated with one of the received offsets for virtual block device 190. In such examples, in response to any valid virtual machine request for an I/O operation at any one of virtual disks 132, instructions 128 may provide to storage server 150 a request 186 for an I/O operation at a target offset of virtual block device 170. The target offset may be based on the offset of virtual block device 170 associated with the virtual disk accessed in response to the virtual machine request, for example.

For example, in response to a virtual machine request 184 for an I/O operation at virtual disk 132A, instructions 128 may provide to storage server 150 a request 186 for an I/O operation at a target offset of virtual block device 170, where the target offset is based on offset 133A of virtual block device 170. In some examples, virtual block device 170 may route I/O operation request 186 to persistent volume 160A, since the target offset is based on offset 133A. In this manner, host server 100 may provide virtual machines hosted on host server 100 I/O access to a plurality of persistent volumes managed by storage server 150 through a single attachable unit in a manner that is transparent to the virtual machines. As used herein, I/O access may be access allowing I/O operations to be performed.

As described above, virtual block device 170 may be associated with a LUN 171 of target 152 of storage server 150. In such examples, instructions 128 may provide each I/O request 186 to storage server 150 as a request to access LUN 171 at an offset associated with the virtual disk accessed in response to a virtual machine request 184 triggering the I/O request 186. In some examples, host server 100 may provide I/O operation requests to storage servers using the iSCSI protocol. In such examples, each I/O request 186 may be an iSCSI protocol request for an I/O operation at an offset of LUN 171. In other examples, host server 100 may use a different protocol to provide I/O operation requests to the storage servers. For example, host server 100 may use the AOE protocol for I/O operation communications with storage servers, or any other protocol suitable for providing storage device I/O operation requests over a network.

As described above, offsets may be received by instructions 124 via a protocol different than the protocol used by host server 100 to provide I/O operation requests to storage servers. For example, in examples in which host server 100 uses the iSCSI protocol to provide I/O operation requests to storage servers, instructions 124 may receive offsets via a protocol other than iSCSI.

Additionally, in the example of FIG. 2, instructions 126 may also present virtual disks 134 to the virtual machines. In the example of FIG. 2, the set of virtual disks 134 includes virtual disks 134A and 134B. In other examples, the set of virtual disks 134 may include more than two virtual disks. In some examples, each of virtual disks 134 is associated with one of the received offsets for virtual block device 190. For example, virtual disks 134 may include a virtual disk 134A associated with offset 135A of virtual block device 190, and virtual disk 134B is associated with offset 135B of virtual block device 190. In such examples, in response to any valid virtual machine request for an I/O operation at any one of virtual disks 134, instructions 128 may provide to storage server 155 a request 189 for an I/O operation at a target offset of virtual block device 190. The target offset may be based on the offset of virtual block device 190 associated with the virtual disk accessed in response to the virtual machine request. In other examples, at least one of virtual disks 134 may be associated with an offset of a virtual block device other than virtual block device 190. For example, virtual disk 1346 may be associated with an offset of virtual block device 170.

For example, in response to a virtual machine request 188 for an I/O operation at virtual disk 134A, instructions 128 may provide to storage server 155 a request 189 for an I/O operation at a target offset of virtual block device 190, where the target offset is based on offset 135A of virtual block device 190. In some examples, virtual block device 190 may route I/O operation request 189 to persistent volume 160C, since the target offset is based on offset 135A. In this manner, host server 100 may provide virtual machines hosted on host server 100 I/O access to a plurality of persistent volumes managed by storage server 155 through a single attachable unit in a manner that is transparent to the virtual machines.

As described above, virtual block device 190 may be associated with a LUN 191 of target 156 of storage server 155. In such examples, instructions 128 may provide each I/O request 189 to storage server 155 as a request for an I/O operation at an offset of LUN 191. In some examples, each I/O request 189 may be an iSCSI protocol request for an I/O operation to an offset of LUN 191.

In the examples described above in relation to FIG. 2, host server 100 may access multiple persistent volumes of a first storage server 150 via a single virtual block device, and thus through a single attachable unit. As such, in some examples, host server 100 may attach a single LUN (e.g., LUN 171) of storage server 150 to gain I/O access to a plurality of persistent volumes managed by storage server 150 (e.g., each persistent volume of the storage server desired by host server 100). Similarly, in some examples, host server 100 may access multiple persistent volumes of a second storage server 155 via a single virtual block device, and thus through a single attachable unit, such as a single LUN (e.g., LUN 191). Accordingly, in some examples, host server 100 may request I/O operations of multiple persistent volumes at each of a plurality of storage servers, while only attaching one attachable unit (e.g., LUN) per storage server accessed. Additionally, by presenting to virtual machines hosted at host server 100 virtual disks mapped to the virtual block device, the use of virtual block devices may be transparent to the virtual machines. In some examples, functionalities described herein in relation to FIGS. 1-2 may be provided in combination with functionalities described herein in relation to any of FIGS. 3A-5.

Figure 3A:
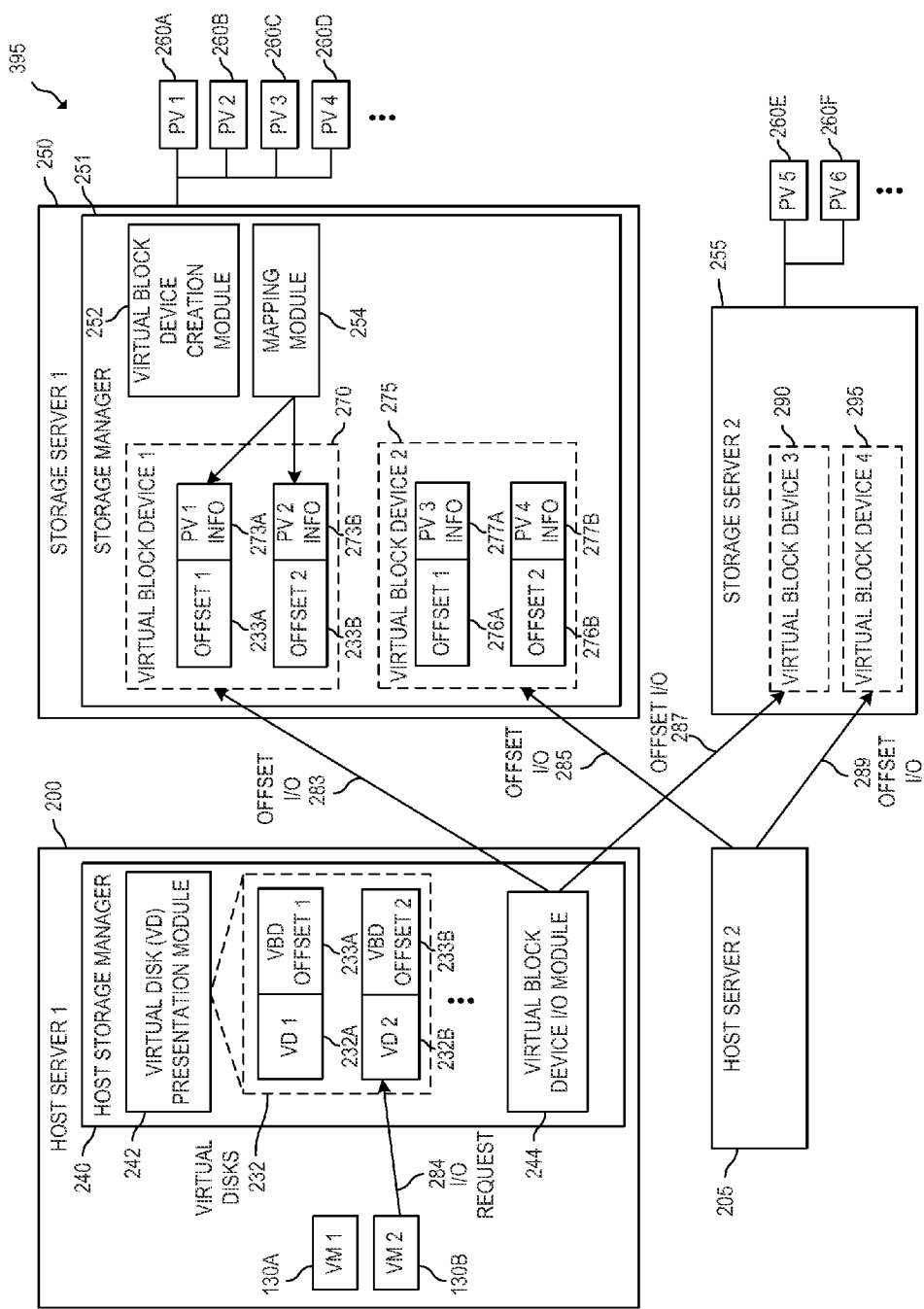
FIG. 3A is a block diagram of an example system including a host server to access persistent volumes via virtual block devices.

FIG. 3A is a block diagram of an example system 395 including a host server 200 to access persistent volumes via virtual block devices. In the example of FIG. 3A, system 395 includes host servers 200 and 205, and storage servers 250 and 255. In the example of FIG. 3A, storage server 250 may include a storage manager 251 including modules 252 and 254. In some examples, the functionalities of storage manager 251 and modules 252 and 254 may each be implemented in the form of executable instructions encoded on a machine-readable storage medium, in the form of electronic circuitry, or a combination thereof. In some examples, storage server 250 may manage a plurality of persistent volumes including at least persistent volumes 260A-260D. In the example of FIG. 3A, storage server 255 may implement functionalities analogous to those described herein in relation to storage server 250. For example, storage server 255 may include a storage manager 251, as described above in relation to storage server 250, and manage a plurality of persistent volumes including at least persistent volumes 260E and 260F.

In the example of FIG. 3A, virtual block device creation module 252 may create a virtual block device 270 associated with host server 200. For example, after creation, virtual block device 270 may be presented as an attachable unit (e.g., a LUN, etc.) to host server 200, and host server 200 may attach virtual block device 270. Any virtual block device created by a storage server, as described herein, may be created with a very large address space into which persistent volumes may be mapped at various offsets. In some examples, a virtual block device may be created with sufficient address space to map into the virtual block device a total of $2^{64}$ bytes of storage, for example. Additionally, any virtual block device described herein may initially have no storage mapped to the virtual block device upon creation. In such examples, a virtual block device with no mapped storage may respond to any request for an I/O operation with an error indication.

In the example of FIG. 3A, mapping module 254 may receive indications identifying particular persistent volumes managed by storage server 250 for I/O access by host server 200. In response, module 254 may map the persistent volumes identified for I/O access by host server 200 to respective offsets of virtual block device 270. For example, module 254 may receive instructions to present at least one of persistent volumes 260A-260D to host server 200 for I/O access. In some examples, a system manager of a cloud computing system including storage server 250 and host server 200 may instruct storage server 250 to present particular persistent volumes to host server 200 for I/O access. In the example of FIG. 3A, for example, mapping module 254 may receive instructions to present persistent volumes 260A and 260B to host server 200 for I/O access. In response, module 254 may, for example, map persistent volume 260A to an offset 233A and map persistent volume 260B to an offset 233B. Each of offsets 233A and 233B may be a boundary offset. Mapping module 254 may also associate persistent volume information 273A for persistent volume 260A with offset 233A and associate persistent volume information 273B for persistent volume 260B with offset 233B. In some examples, module 254 may determine a virtual block device offset at which to map an identified persistent volume. In other examples, module 254 may receive (e.g., from the system manager) a specified offset at which to map the identified persistent volume.

In the example of FIG. 3A, host server 200 includes a host storage manager 240 including modules 242 and 244. In some examples, the functionalities of host storage manager 240 and modules 242 and 244 may each be implemented in the form of executable instructions encoded on a machine-readable storage medium, in the form of electronic circuitry, or a combination thereof. Host server 200 may host at least one virtual machine. For example, host server 200 may host at least virtual machines 130A and 130B. In some examples, host server may include a hypervisor to manage the execution of a plurality of virtual machines on host server 200.

In some examples, virtual disk presentation module 242 may receive the offsets to which the persistent volumes identified for I/O access by host server are mapped in virtual block device 270. For example, after mapping module 254 maps identified persistent volumes to virtual block device 270, storage server 250 may provide the offsets of those persistent volumes to host server 200 via an out-of-band mechanism. In some examples, storage server 250 may provide the offsets to a system manager, and module 242 may receive the offsets from the system manager. In other examples, the system manager may provide the respective offsets for the persistent volumes to storage server 250 and host server 200.

After receiving the offsets, module 242 may present to the virtual machines hosted at hosting server 200 a plurality of virtual disks 232 of host server 200. In some examples, module 242 may present virtual disks 232 to the virtual machines as described above in relation to host server 100. In some examples, any virtual machine hosted at host server 200 may be assigned or given access to any virtual disk of host server 200. In the example of FIG. 3A, each of the presented virtual disks 232 is associated with a respective one of the offsets of virtual block device 270 to which the persistent volumes identified for I/O access by host server 200 are mapped. For example, after receiving offsets 233A and 233B of virtual block device 270, module 242 may present virtual disks 232A and 232B associated with offsets 233A and 233B, respectively. In some examples, module 242 may present as many virtual disks 232 as there are persistent volumes mapped to virtual block device 270.

In the example of FIG. 3A, virtual block device I/O module 244 may access persistent volumes identified for I/O access by host server 200. In some examples, module 244 may access one of these persistent volumes via a request 283 to storage server 250 for an I/O operation at a target offset of virtual block device 270. In the example of FIG. 3A, module 244 may provide a request 283 in response to any valid request of a virtual machine hosted at hosting server 200 for an I/O operation at any one of the presented virtual disks 232. In some examples, module 242 may determine whether a virtual machine request is valid as described above in relation to FIG. 1. In the example of FIG. 3A, the target offset of the request 283 may be based on the virtual block device offset associated with the virtual disk accessed in response to the triggering virtual machine request, as described above in relation to FIG. 1. For example, the target offset may be based on the virtual block device offset associated with the virtual disk specified in the triggering virtual machine request.

For example, virtual machine 130B may provide a request 284 for an I/O operation at virtual disk 232B. In some examples, request 284 may be received by virtual disk 232B at host storage manager 240. If request 284 is determined to be valid at host storage manager 240, then in response to request 284, module 244 may access persistent volume 260B via a request 284 to storage server 250 for an I/O operation at a target offset based on offset 233B associated with virtual disk 232B.

As described above, system 295 also includes a host server 205. In the example of FIG. 3A, host server 205 may be similar to host server 200. For example, host server 205 may host at least one virtual machine and may include, for example, a hypervisor to manage the execution of the virtual machines. In such examples, host server 205 may host virtual machines different than those hosted at host server 200. In some examples, host server 200 may also include a host storage manager 240 and modules 242 and 244, as described above in relation to host server 200.

In the example of FIG. 3A, creation module 252 of storage server 250 may create a virtual block device 275 associated with host server 205 and present the virtual block device 275 to host server 205 as an attachable unit (e.g., a LUN, etc.). Host server 205 may attach virtual block device 275. In some examples, mapping module 254 may receive indications identifying persistent volumes managed by storage server 250 for I/O access by host server 205, as described above in relation to host server 200. In response, module 254 may map the identified persistent volumes to respective offsets of virtual block device 275 for I/O access by host server 205.

In the example of FIG. 3A, mapping module 254 may receive instructions to present persistent volumes 260C and 260D to host server 205 for I/O access. In response, module 254 may map persistent volume 260C to an offset 276A and map persistent volume 260D to an offset 276B. Each of offsets 276A and 276B may be a boundary offsets. Mapping module 254 may also associate persistent volume information 277A for persistent volume 260C with offset 276A and associate persistent volume information 277B for persistent volume 260D with offset 277B.

In some examples, host server 205 may receive the offsets (e.g., 276A and 276B, etc.) to which the identified persistent volumes are mapped in virtual block device 275, as described above in relation to host server 200. The host storage manager of host server 205 may present to the virtual machines of host server 205 a plurality of virtual disks, each associated with a respective offset (e.g., 276A, 276B, etc.) of virtual block device 275.

In the example of FIG. 3A, module 244 of host server 205 may access the persistent volumes identified for I/O access by host server 205. In some examples, module 244 may access one of the identified persistent volumes via a request 285 to storage server 250 for an I/O operation at a target offset of virtual block device 275. In the example of FIG. 3A, module 244 may provide a request 285 in response to any valid request of a virtual machine hosted at hosting server 205 for an I/O operation at any one of the virtual disks presented by host server 205 and associated with an offset of virtual block device 275, as described above in relation to host server 200. In some examples, module 242 may determine whether a virtual machine request is valid as described above in relation to host server 200. In some examples, the target offset of the request 283 may be based on the virtual block device offset associated with the virtual disk accessed in response to the triggering virtual machine request or that is specified in the triggering request.

As described above, system 295 also includes a storage server 255. In some examples, storage server 255 may include a storage manager 251 and modules 252 and 254, as described above in relation to storage server 250. In the example of FIG. 3A, storage server 255 may manage a plurality of persistent volumes, including at least persistent volumes 260E and 260F. In the example of FIG. 3A, storage server 255 may create a virtual block device 290 associated with host server 200 and a virtual block device 295 associated with host server 205, as described above in relation to storage server 250. Storage server 255 may present virtual block device 290 as an attachable unit (e.g., a LUN, etc.) to host server 200, and host server 200 may attach virtual block device 290. Similarly, storage server 255 may present virtual block device 295 as an attachable unit (e.g., a LUN, etc.) to host server 205, and host server 205 may attach virtual block device 295.

In some examples, storage server 255 may receive indications identifying persistent volumes managed by storage server 255 to be made available for I/O access by host server 200. In response, module 254 may map the identified persistent volumes to respective offsets of virtual block device 290, wherein the offsets are determined by module 254 or received from the system manager, for example. These offsets of virtual block device 290 may be provided via an out-of-band mechanism to host server 200 by storage server 255 and/or the system manager, for example. Module 242 may present to the virtual machines hosted on host server 200 an additional set of virtual disks different than virtual disks 232 and associated with the received offsets for virtual block device 290.

In response to any valid virtual machine request for an I/O operation at any one of the additional virtual disks, module 244 may access one of the persistent volumes of storage server 255 and identified for I/O access by host server 200, as described above in relation to virtual disks 232. For example, to access the persistent volume, module 244 may provide to storage serve 255 a request 287 for an I/O operation at a target offset of virtual block device 290, wherein the target offset is based on the offset associated with the virtual disk accessed in response to the triggering request. In some examples, module 244 may be multiple modules, each for accessing a virtual block device of a different storage server.

Additionally, in some examples, storage server 255 may receive indications identifying persistent volumes managed by storage server 255 to be made available for I/O access by host server 205. In response, module 254 may map the identified persistent volumes to respective offsets of virtual block device 295 associated with host server 205, wherein the offsets are determined by module 254 or received from the system manager, for example. These offsets may be provided via an out-of-band mechanism to host server 205 by storage server 255 and/or the system manager, for example. In some examples, host server 205 may present the virtual machines hosted thereon with an additional set of virtual disks associated with the received offsets of virtual block device 295. In response to any valid virtual machine request for an I/O operation at any one of the additional virtual disks, host server 205 may access one of the persistent volumes of storage server 255 and identified for I/O access by host server 205, as described above in relation to the virtual disks associated with the offsets of virtual block device 275. For example, to access the persistent volume, host server 205 may provide to storage serve 255 a request 289 for an I/O operation at a target offset of virtual block device 295, wherein the target offset is based on the offset associated with the virtual disk accessed in response to the triggering request.

In the examples described above in relation to FIG. 3A, each storage server may present a plurality of persistent volumes to a host server through a single attachable unit, namely a single virtual block device. In some examples, each storage server may present an attachable unit for each host server making I/O access to persistent volumes managed by the storage server. Also, in examples described above, each host server may access a plurality of persistent volumes at each of a plurality of storage servers, while only attaching one attachable unit (e.g., virtual block device) per storage server.

In other examples, rather than accessing persistent volumes managed by storage server 250 through a separate virtual block device 275, host server 205 may instead access persistent volumes managed by storage server 250 via virtual block device 270. In such examples, multiple host servers may use the same virtual block device at a storage server. In such examples, a storage server may provide access to persistent volumes through fewer virtual block devices (and thus attachable units) than host servers making I/O access to the storage server's persistent volumes. In some examples, a storage server may create one virtual block device to be used by all host servers making I/O access to its persistent volumes. In such examples, the storage server may provide I/O access to a plurality of persistent volumes by a plurality of host server through one attachable unit.

Figure 3B:
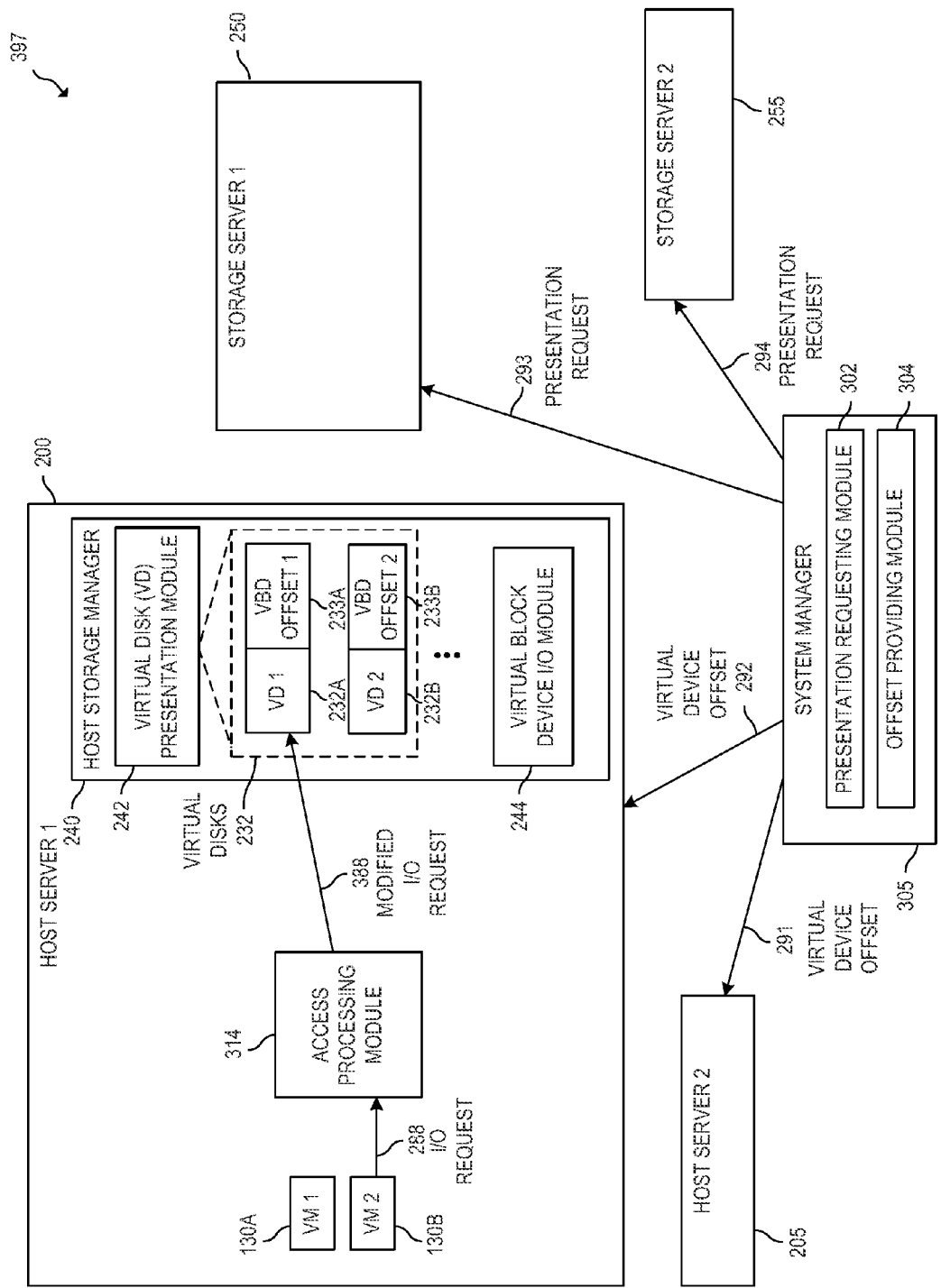
FIG. 3B is a block diagram of an example system including a system manager to provide virtual block device offsets to host servers.

FIG. 3B is a block diagram of an example system 397 including a system manager 305 to provide virtual block device offsets to host servers. In the example of FIG. 3B, system 397 may include host servers 200 and 205, as described above in relation to FIG. 3A, except that the host servers may additionally include one or more access processing modules. System 397 may further include storage servers 250 and 255, as described above in relation to FIG. 3A, and a system manager 305. In some examples, system 397 may include more than two host servers and/or more than two host servers.

In the example of FIG. 3B, system manager 305 may include modules 302 and 304. In some examples, system manager 305 may implemented on a server separate from the host and storage servers. In other examples, system manager 305 may be implemented on one of the storage or host servers, or may be a distributed system implemented in a distributed manner on two or more of the host and storage servers of system 397. In some examples, the functionalities of modules 302 and 304 may each be implemented in the form of executable instructions encoded on a machine-readable storage medium, in the form of electronic circuitry, or a combination thereof.

In some examples, module 302 may provide persistent volume presentation requests to storage servers of system 397. For example, module 302 may provide at least one presentation request 293 to storage server 250 to request that storage server 250 present to a host server (e.g., host server 200) at least one persistent volume managed by storage server 250. In some examples, a presentation request from system manager 305 may be treated by a host server as an indication identifying persistent volumes for I/O access by a host server. In response to requests 293, for example, storage server 250 may present the persistent volumes identified in the requests 293 to a host server by mapping the persistent volumes to the virtual block device associated with that host server, as described above in relation to FIG. 3A. Similarly, module 302 may, for example, provide presentation requests 294 to storage server 255, which may, in response, map the persistent volumes identified in the requests to the virtual block device associated with a host server specified in the request.

In some examples, after a storage server maps a persistent volume to a virtual block device, the storage server may provide the system manager the offset to which the persistent volume has been mapped. In such examples, offset providing module 304 may receive these offsets and provide them to the appropriate host server. For example, module 304 may receive offsets to which persistent volumes have been mapped for I/O access by host server 200. Module 304 may then provide these offsets to host server 200 via at least one offset communication 292. Similarly, module 304 may provide offsets to host server 205 via at least one offset communication 291. In other examples, presentation requesting module 302 of system manager 305 may specify to the storage server the offsets to which the storage server is to map the persistent volumes. For example, the presentation requests of module 302 may specify a persistent volume to be presented to a host server and a virtual block device offset at which the persistent volume is to be mapped. In such examples, module 304 may provide the offsets to the host servers without first receiving them from storage servers.

Additionally, in examples in which system manager 305 specifies the offsets, persistent volumes of system 397 may be may be mapped to virtual block device offsets in a globally exclusive manner such that no more than one persistent volume is mapped to a particular offset across all virtual block devices and storage servers. For example, while a given persistent volume is mapped to an offset "0" of a virtual block device of a storage server, no other persistent volume may be mapped to offset "0" of any other virtual block device either on the same or a different storage server. In the example of FIG. 3A, for example, the offsets of virtual block device 270 to which persistent volumes of storage server 250 are mapped may each be different from the offsets of virtual block device 290 to which persistent volumes of storage server 255 are mapped.

As noted above, in the example of FIG. 3A, host server 200 may include an access processing module 314. In some examples, the functionalities of module 314 may be implemented in the form of executable instructions encoded on a machine-readable storage medium, in the form of electronic circuitry, or a combination thereof. In some examples, rather than providing a request for an I/O operation directly to a virtual disk, a virtual machine of host server 200 may provide the request to module 314, which may reroute or otherwise modify the request and then provide the modified request to one of the virtual disks.

For example, in the example of FIG. 3A, module 314 may receive, from virtual machine 130B, a virtual machine request 288 for an I/O operation at one of virtual disks 232. In some examples, module 314 may modify the virtual machine request 288, and then provide the modified virtual machine request 388 to one of virtual disks 232 (e.g., virtual disk 232A). For example, module 314 may provide one at least layer of processing for virtual machine requests. In some examples, module 314 may perform encryption on at least a portion of a virtual machine I/O operation request. For example, when the I/O operation of virtual machine request 288 is a write request, module 314 may encrypt or decrypt the data to be written and then provide the modified data for writing in the modified virtual machine request 388. In other examples, module 314 may reroute virtual machine request 288 to another virtual disk presented at host server 200. In such examples, module 314 may modify virtual machine request 288 to accomplish the rerouting. In other examples, module 314 may provide other request modifying functionalities. In some examples, module 314 may provide a plurality of these functionalities, or a plurality of modules 314 (or layers) providing different functionalities may be provided in-line between the virtual machines and the virtual disks for processing and/or rerouting virtual machine I/O operation requests. In some examples, functionalities described herein in relation to FIGS. 3A and 3B may be provided in combination with functionalities described herein in relation to any of FIGS. 1-2 and 4-5.

Figure 4:
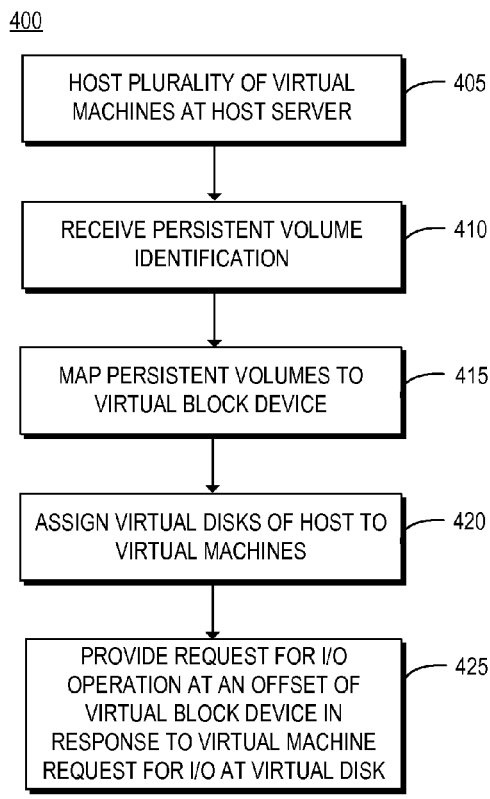
FIG. 4 is a flowchart of an example method for accessing a virtual block device of a storage server.

FIG. 4 is a flowchart of an example method 400 for accessing a virtual block device of a storage server. Although execution of method 400 is described below with reference to system 295 of FIG. 2, other suitable components for execution of method 400 can be utilized (e.g., system 395 or 397). Additionally, method 400 may be implemented in the form of executable instructions encoded on a machine-readable storage medium, in the form of electronic circuitry, or a combination thereof.

At 405 of method 400, host server 100 may host at least one virtual machine, as described above in relation to FIG. 1. At 410, a storage server, such as storage server 150, may receive identification of persistent volumes, managed by the storage server, that are to be presented to host server 100 for I/O access. In some examples, the storage server may receive the identification of persistent volumes to present to the host server from a system manager, as described above in relation to FIGS. 3A and 3B.

At 415, storage server 150 may map each identified persistent volume to a respective offset of virtual block device 170 of storage server 150 and associated with host server 100. In some examples, respective offsets to which the persistent volumes are mapped may be provided to host server 100, and host server 100 may create a virtual disk corresponding to each of the identified persistent volumes at host server 100. In such examples, each of the virtual disks may be associated with one of the received offsets to which one of the identified persistent volumes is mapped. At 420, host server 100 may assign a plurality of the created virtual disks to the virtual machines, respectively.

In the example of FIG. 4, a virtual machine may request an I/O operation at its assigned virtual disk. At 425, in response to any such virtual machine request, host server 100 may provide, to storage server 150, a request for an I/O operation at a target offset of virtual block device 170. In some examples, the target offset may be based on the offset of virtual block device 170 associated with the virtual disk accessed in response to the virtual machine request, as described above in relation to FIG. 1.

Figure 5:
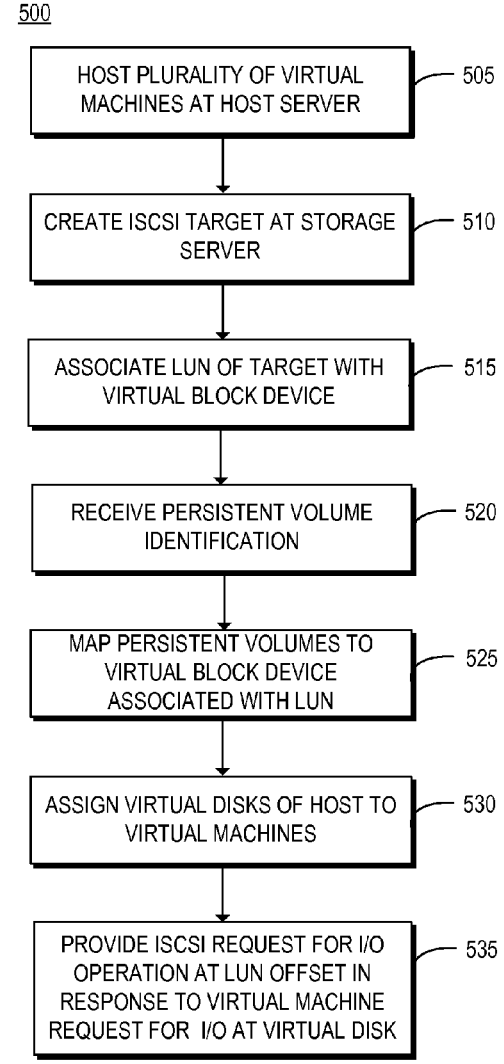
FIG. 5 is a flowchart of an example method for accessing a virtual block device via a logical unit number (LUN) of a storage server.

FIG. 5 is a flowchart of an example method 500 for accessing a virtual block device via a logical unit number (LUN) of a storage server. Although execution of method 500 is described below with reference to system 295 of FIG. 2, other suitable components for execution of method 500 can be utilized (e.g., system 395 or 397). Additionally, method 500 may be implemented in the form of executable instructions encoded on a machine-readable storage medium, in the form of electronic circuitry, or a combination thereof.

At 505 of method 500, host server 100 may host at least one virtual machine, as described above in relation to FIG. 1. At 510, a storage server, such as storage server 150, may create an iSCSI target 152 at storage server 150. In other examples, storage server 150 may create a target for use with another communication protocol. In some examples, storage server 150 may also create a virtual block device 170 associated with host server 100. After creating virtual block device 170, storage server 150 may present virtual block device 170 to host server 100 as an attachable unit so that host server 100 may attach virtual block device 170. In the example of FIG. 5, host server 100 may associate a LUN 171 of target 152 with virtual block device 170 at 515 of method 500. In such examples, host server 100 may attach virtual block device 170 through target 152 and LUN 171.

At 520, storage server 150 may receive identification of persistent volumes, managed by storage server 150, that are to be presented to host server 100 for I/O access, as described above in relation to FIGS. 3A and 3B, for example. At 525, storage server 150 may map each identified persistent volume to a respective offset of virtual block device 170 associated with LUN 171, and associated with host server 100. In some examples, respective offsets to which the persistent volumes are mapped may be provided to host server 100, and host server 100 may create a virtual disk corresponding to each of the identified persistent volumes at host server 100. In such examples, each of the virtual disks may be associated with one of the received offsets to which one of the identified persistent volumes is mapped. At 530, host server 100 may assign a plurality of the created virtual disks to the virtual machines, respectively.

In the example of FIG. 5, a virtual machine may request an I/O operation at its assigned virtual disk. At 535, in response to any such virtual machine request, host server 100 may provide, to storage server 150, a request for an I/O operation at a target offset of virtual block device 170. In some examples, the target offset may be based on the offset of virtual block device 170 associated with the virtual disk accessed in response to the virtual machine request, as described above in relation to FIG. 1. In some examples, host serve 100 may provide the request to the iSCSI target 152 as an iSCSI protocol request to access LUN 171 at the target offset. In other examples, host server 100 may provide the request using another protocol, such as AOE, or any other protocol suitable for providing storage device I/O operation requests over a network.

What is claimed is:

1. A non-transitory machine-readable storage medium encoded with instructions executable by a processor of a host server to host a plurality of virtual machines, the storage medium comprising:
   instructions to associate a first virtual block device of a first storage server with the host server;
   instructions to receive first virtual block device offsets to which respective first persistent volumes managed by the first storage server are mapped;
   instructions to present, to the virtual machines, a plurality of first virtual disks of the host server, each associated with one of the received first virtual block device offsets, wherein the plurality of first virtual disks of the host server are mapped Into an address space of the first virtual block device at respective first virtual block device offsets; and
   instructions to provide to the first storage server a request for an input/output (I/O) operation at a first target offset of the first virtual block device, in response to a valid virtual machine request for an I/O operation at any one of the first virtual disks, wherein the first target offset is based on the first virtual block device offset associated with the first virtual disk accessed in response to the virtual machine request.

2. The storage medium of claim 1, wherein:
   the first virtual block device is associated with a first logical unit number (LUN) of the first storage server; and
   the first virtual block device I/O operation request is an Internet Small Computer System Interface (iSCSI) protocol request for an I/O operation at the first LUN.

3. The storage medium of claim 2, wherein the instructions to receive the first virtual block device offsets comprise:
   instructions to receive the first virtual block device offsets via a protocol different than iSCSI.

4. The storage medium of claim 2, wherein:
   the instructions to associate are further to associate a second virtual block device of a second storage server with the host server;
   the instructions to receive offsets are further to receive second virtual block device offsets to which respective second persistent volumes managed by the second storage server are mapped;
   the instructions to present the first virtual disks are further to present, to the virtual machines, a plurality of second virtual disks of the host server, each associated with one of the received second virtual block device offsets; and
   the instructions to provide are further to provide, to the second storage server, a request for an I/O operation at a second target offset of the second virtual block device, in response to any valid virtual machine request for an I/O operation at any one of the second virtual disks, wherein the second target offset is based on the second virtual block device offset associated with the second virtual disk accessed in response to the virtual machine request.

5. A system comprising:
   a first host server to host a plurality of first virtual machines; and
   a first storage server to:
   create a first virtual block device associated with the first host server; and
   map each of a plurality of first persistent volumes managed by the first storage server and identified for input/output (I/O) access by the first host server to a respective offset in the first virtual block device, wherein a plurality of first virtual disks of the first host server are mapped into an address space of the first virtual block device at respective first virtual block device offsets;

wherein the first host server comprises a host storage manager to:

present, to the first virtual machines, a plurality of first virtual disks of the first host server, each associated with a respective one of the first virtual block device offsets to which the identified first persistent volumes are mapped; and access one of the identified first persistent volumes via a request, to the first storage server, for an I/O operation at a first target offset of the first virtual block device, in response to any valid first virtual machine request for an I/O operation at any one of the first virtual disks, the first target offset based on the first virtual block device offset associated with one of the first virtual disks.

6. The system of claim 5, wherein the first target offset is based on the first virtual block device offset associated with the first virtual disk specified in the first virtual machine request.

7. The system of claim 5, wherein the host storage manager further comprises at least one access processing module to:

receive the virtual machine request for an I/O operation at one of the first virtual disks;
modify the virtual machine request; and
provide the modified virtual machine request to one of the first virtual disks.

8. The system of claim 5, further comprising:
a system manager to:
request that the first storage server present the plurality of first persistent volumes to the first host server; and
provide, to the first host server, the first virtual block device offsets to which the first persistent volumes are mapped.

9. The system of claim 5, further comprising:
a second host server to:
host a plurality of second virtual machines;
present, to the second virtual machines, a plurality of second virtual disks of the second host server; and
provide, to the first storage server, a request for an I/O operation at a second target offset of the first virtual block device, in response to any valid second virtual machine request for an I/O operation at any one of the second virtual disks, the second target offset based on a first virtual block device offset associated with the second virtual disk accessed in response to the second virtual machine request.

10. The system of claim 5, further comprising:
a second host server to:
host a plurality of second virtual machines;
present, to the second virtual machines, a plurality of second virtual disks of the second host server, each associated with an respective offset of a second virtual block device of the first storage server; and
provide, to the first storage server, a request for an I/O operation at a second target offset of the second virtual block device, in response to any valid second virtual machine request for an I/O operation at any one of the second virtual disks, the second target offset based on the second virtual block device offset associated with the second virtual disk accessed in response to the second virtual machine request.

11. The system of claim 10, further comprising:
a second storage server to:
create a third virtual block device associated with the first host server; and
map each of a plurality of second persistent volumes managed by the second storage server and Identified for I/O access by the first host server to a respective offset in the third virtual block device;

wherein the host storage manager of the first host server is further to:
present, to the first virtual machines, a plurality of third virtual disks of the first host server, each associated with a respective one of the third virtual block device offsets to which the identified second persistent volumes are mapped; and
access one of the identified second persistent volumes via a request, to the second storage server, for an I/O operation at a third target offset of the third virtual block storage device, in response to any valid first virtual machine request for an I/O operation at any one of the third virtual disks, the third target offset based on the third virtual block device offset associated with the third virtual disk accessed in response to the first virtual machine request.

12. The system of claim 11, wherein the second host server is further to:
present, to the second virtual machines, a plurality of fourth virtual disks of the second host server; and
provide, to the second storage server, a request for an I/O operation at a fourth target offset of a fourth virtual block device of the second storage server, in response to any valid second virtual machine request for an I/O operation at any one of the fourth virtual disks, the fourth target offset based on a fourth virtual block device offset associated with the fourth virtual disk accessed in response to the second virtual machine request;
wherein the third virtual block device offsets to which the identified second persistent volumes are mapped are each different than the first virtual block device offsets to which the identified first persistent volumes are mapped.

13. A method comprising:
hosting a plurality of virtual machines at a host server;
receiving identification of a plurality of persistent volumes for I/O access by the host server, the persistent volumes managed by a storage server;
identifying for I/O access by the host server, a plurality of persistent volumes managed by a storage server;
mapping each of the identified persistent volumes managed by the storage server to respective offsets of a virtual block device of the storage server, wherein the virtual block device is associated with the host server;
assigning a plurality of virtual disks of the host server to the virtual machines, respectively, wherein each of the virtual disks is associated with a respective virtual block device offset to which one of the persistent volumes is mapped, wherein a plurality of virtual disks of the host server are mapped into an address space of the virtual block device at respective virtual block device offsets; and
providing, from the host server to the storage server, a request for an input/output (I/O) operation at a target offset of the virtual block device, in response to any virtual machine request for an I/O operation at its assigned virtual disk, the target offset based on the virtual block device offset associated with the virtual disk accessed in response to the virtual machine request.

14. The method of claim 13, further comprising:

creating an Internet Small Computer System Interface (iSCSI) target at the storage server; and associating a logical unit number (LUN) of the iSCSI target with the virtual block device.

15. The method of claim 14, further comprising:

providing the request for the I/O operation at the target offset of the virtual block device to the iSCSI target as an iSCSI protocol request to access the LUN at the target offset.

* * * * *

UNITED STATES PATENT AND TRADEMARK OFFICE
CERTIFICATE OF CORRECTION

PATENT NO. : 9,158,568 B2
APPLICATION NO. : 13/360956
DATED : October 13, 2015
INVENTOR(S) : Timothy Reddin et al.

It is certified that error appears in the above-identified patent and that said Letters Patent is hereby corrected as shown below:

Specification

In column 10, line 9, delete "1346" and insert -- 134B --, therefor.

Claims

In column 18, line 18, in Claim 1, delete "Into" and insert -- into --, therefor.

Signed and Sealed this
Fifth Day of April, 2016

Michelle K. Lee
*Director of the United States Patent and Trademark Office*